United States Patent
Tanaka

(10) Patent No.: US 6,907,722 B2
(45) Date of Patent: Jun. 21, 2005

(54) GAS COMPRESSOR CONTROL DEVICE AND GAS TURBINE PLANT CONTROL MECHANISM

(75) Inventor: Satoshi Tanaka, Takasago (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 152 days.

(21) Appl. No.: 10/625,600

(22) Filed: Jul. 24, 2003

(65) Prior Publication Data

US 2004/0045275 A1 Mar. 11, 2004

(30) Foreign Application Priority Data

Sep. 11, 2002 (JP) ........................................ 2002-265138

(51) Int. Cl.[7] .............................. F02C 3/22; F02C 9/00
(52) U.S. Cl. ............................... 60/39.281; 60/39.465; 415/27
(58) Field of Search ............................ 60/39.281, 39.465, 60/734; 415/27

(56) References Cited

U.S. PATENT DOCUMENTS 3,104,524 A * 9/1963 Flanders .................. 60/39.281
5,609,016 A * 3/1997 Yamada et al. ........... 60/39.281
6,293,766 B1 * 9/2001 Blotenberg ................... 417/300
6,551,068 B2 * 4/2003 Blotenberg .................... 415/27

FOREIGN PATENT DOCUMENTS

JP  6-241062 A  8/1994

* cited by examiner

*Primary Examiner*—Louis J. Casaregola
(74) *Attorney, Agent, or Firm*—Birch, Stewart, Kolasch & Birch, LLP

(57) ABSTRACT

A gas compressor control device and a gas turbine plant control mechanism are disclosed. A fuel gas pressurized by a gas compressor is supplied to a gas turbine via fuel gas piping. A gas turbine control device adjusts the flow rate of the fuel gas into the gas turbine by exercising opening and closing control of a pressure control valve and a flow control valve. The gas compressor control device controls a fuel gas pressure at the outlet of the gas compressor by effecting opening and closing control of a recycle valve and an IGV. If load rejection or load loss occurs, the gas compressor control device opens the recycle valve in a preceding manner and closes the IGV in a preceding manner. Thus, elevation of the fuel gas pressure at the gas compressor outlet can be prevented, and elevation of a fuel gas pressure at an inlet of the gas turbine can be suppressed, thereby ensuring stable operation.

2 Claims, 4 Drawing Sheets

GAS COMPRESSOR CONTROL DEVICE AND GAS TURBINE PLANT CONTROL MECHANISM

The entire disclosure of Japanese Patent Application No. 2002-265138 filed on Sep. 11, 2002, including specification, claims, drawings and summary, is incorporated herein by reference in its entirety.

BACKGROUND OF THE INVENTION

1. Field of the Invention

This invention relates to a gas compressor control device and a gas turbine plant control mechanism, which are designed to be capable of suppressing a rise in the pressure of a fuel gas supplied to a gas turbine, even if load rejection or load loss occurs.

2. Description of the Related Art

In a gas turbine plant, as shown in FIG. 4, a gas turbine 2 for rotationally driving a generator 1 is supplied with a fuel gas from a gas compressor 4 via fuel gas piping 3. That is, the fuel gas for use in the gas turbine 2 is pressurized by the gas compressor 4 to a pressure suitable for the gas turbine 2.

The amount of fuel consumed by the gas turbine 2 varies with a generator load required of the gas turbine 2. In detail, when a gas turbine generator output increases, a fuel gas pressure $P_2$ at the inlet of the gas turbine lowers, so that the gas compressor 4 is further required to raise the pressure of the fuel gas. When the gas turbine generator output decreases, on the other hand, the fuel gas pressure $P_2$ at the gas turbine inlet increases, so that the gas compressor 4 is required to lower the pressure of the fuel gas.

A conventional concrete control method for controlling the gas turbine 2 and the gas compressor 4 will be described hereinafter.

As shown in FIG. 4, a pressure control valve 5 and a flow control valve 6 are interposed in the fuel gas piping 3. The pressure control valve 5 is disposed upstream (closer to the gas compressor 4), while the flow control valve 6 is disposed downstream (closer to the gas turbine 2).

A gas turbine control device 10 controls the valve opening of the flow control valve 6 (i.e. PID control) such that a deviation between an actual generator output $W_1$ and a preset target generator load set value $W_0$ is zero. The gas turbine control device 10 also controls the valve opening of the pressure control valve 5 (i.e. PID control) such that a deviation between a flow control valve differential pressure $\Delta P_1$, which is the difference between the fuel gas pressure upstream from the flow control valve 6 and the fuel gas pressure downstream from the flow control valve 6, and a preset flow control valve differential pressure set value $\Delta P_0$ is zero.

The gas compressor 4, on the other hand, is provided with a recycle pipe 7 for returning the fuel gas from the gas compressor outlet to the gas compressor inlet, a recycle valve 8 interposed in the recycle pipe 7, and an IGV (inlet guide vane) 9 for controlling the amount of air taken into the gas compressor 4.

A gas compressor control device 20 finds $P_0-P_1$, which is a deviation between a fuel gas pressure $P_1$ at the gas compressor outlet and a preset fuel gas supply pressure set value $P_0$. Using a control function $FX_1$ for the recycle valve 8, the gas compressor control device 20 controls (PID control) the valve opening of the recycle valve 8 according to the deviation $P_0-P_1$. Using a control function $FX_2$ for the IGV 9, moreover, the gas compressor control device 20 controls (PID control) the valve opening of the IGV 9 according to the deviation $P_0-P_1$.

Namely, the gas compressor control device 20 exercises control to operate the IGV 9 and the recycle valve 8 of the gas compressor 4 so that the fuel gas pressure $P_1$ at the gas compressor outlet is constant. Concretely, the gas compressor control device 20 controls the openings in such a manner as to decrease the opening of the recycle valve 8 and increase the opening of the IGV 9 when exercising control for raising the fuel gas pressure $P_1$, and to increase the opening of the recycle valve 8 and decrease the opening of the IGV 9 when exercising control for lowering the fuel gas pressure $P_1$.

Generally, the gas turbine 2 and the gas compressor 4 are produced by different manufacturers, and it has been common practice that the gas turbine 2 and the gas compressor 4 are not cooperatively controlled.

In gas turbine power generation equipment having a gas turbine and a generator connected together, there has been a technique for exercising preceding control in order to prevent misfire or back fire of a combustor due to combustion instability (see, for example, Japanese Unexamined Patent Publication No. 1994-241062).

If the load on the gas turbine 2 falls abruptly, namely, if load rejection (main shut-off device open) occurs or load loss of the gas turbine occurs, the fuel gas pressure $P_2$ ($P_1$) at the gas turbine inlet (the gas compressor outlet) sharply increases. In this case, conventional simple one-loop feedback control over the pressure on the gas compressor 4, as shown in FIG. 4, is not enough to deal with this sharp increase. Thus, the fuel gas pressure $P_2$ ($P_1$) markedly rises, and then lowers to the desired pressure.

As a result, differential pressure control of the gas turbine may fail to accommodate such pressure changes, so that an excessive amount of fuel is charged into the gas turbine 2, causing breakage to the combustor or fuel oscillations.

Conventionally, therefore, a great distance has been provided between the gas turbine 2 and the gas compressor 4 to lengthen the fuel gas piping 3 and ensure a sufficiently large piping volume, thereby absorbing the elevation of the fuel gas pressure due to a sudden load fall (load rejection, load loss) of the gas turbine.

Recently, however, it has been required to construct a power plant in a small premises area in pursuit of economy. With this restricted premises area, the conventional method of securing long piping between the gas turbine and the gas compressor is nearing its limits.

SUMMARY OF THE INVENTION

The present invention has been accomplished in the light of the earlier technologies. Its object is to provide a gas compressor control device and a gas turbine plant control mechanism which are capable of preventing an excessive increase in a fuel gas pressure within fuel gas piping during occurrence of a sudden load fall (load rejection or load loss), even when the fuel gas piping connecting a gas turbine and a gas compressor together is short.

According to an aspect of the present invention for attaining the above object, there is provided a gas compressor control device for exercising opening control of a recycle valve interposed in a recycle pipe which returns a fuel gas from an outlet of a gas compressor to an inlet of the gas compressor, and opening control of an inlet guide vane provided in the gas compressor, the gas compressor control device comprising:

a computing capability unit for computing a recycle valve normal opening command ($r_1$) and an inlet guide vane normal opening command ($i_1$) based on a deviation between a fuel gas pressure ($P_1$) at the gas compressor outlet and a preset fuel gas supply pressure set value ($P_0$); and a computing capability unit for computing a recycle valve preceding opening command ($r_2$) and an inlet guide vane preceding opening command ($i_2$) based on a deviation between an actual generator output ($W_1$), which is an actual output of a generator rotationally driven by a gas turbine supplied with the fuel gas from the gas compressor, and a first order lag actual generator output ($W_1'$), which has been obtained by first order lag computation of the actual generator output ($W_1$), and the gas compressor control device exercising;

during a normal operation, opening control of the recycle valve based on a value of the recycle valve normal opening command ($r_1$), and opening control of the inlet guide vane based on a value of the inlet guide vane normal opening command ($i_1$); and in an event of a sudden load fall, opening control of the recycle valve based on a value obtained by adding the recycle valve preceding opening command ($r_2$) to the recycle valve normal opening command ($r_1$), and opening control of the inlet guide vane based on a value obtained by adding the inlet guide vane preceding opening command ($i_2$) to the inlet guide vane normal opening command ($i_1$).

Because of the above-described features, in the event of load loss or load rejection, the recycle valve can be opened in a preceding manner, and the inlet guide vane (IGV) can be closed in a preceding manner. As a result, the fuel gas pressure at the gas compressor outlet can be lowered to suppress the elevation of the fuel gas pressure at the gas turbine inlet. Thus, stable operation can be performed.

According to another aspect of the present invention, there is provided a gas turbine plant control mechanism comprising:

a gas compressor control device for exercising opening control of a recycle valve interposed in a recycle pipe which returns a fuel gas from an outlet of a gas compressor to an inlet of the gas compressor, and opening control of an inlet guide vane provided in the gas compressor; and a gas turbine control device for exercising opening control of a pressure control valve and a flow control valve interposed in gas piping which feeds the fuel gas from the gas compressor to a gas turbine, and wherein:

the gas turbine control device comprises a capability unit for feeding an actual generator output ($W_1$), which is an actual output of a generator rotationally driven by the gas turbine, to the gas compressor control device, and for feeding a load sudden fall signal to the gas compressor control device for a preset period of time when load loss or load rejection occurs; and the gas compressor control device comprises:

a computing capability unit for computing a recycle valve normal opening command ($r_1$) and an inlet guide vane normal opening command ($i_1$) based on a deviation between a fuel gas pressure ($P_1$) at the gas compressor outlet and a preset fuel gas supply pressure set value ($P_0$); and a computing capability unit for computing a recycle valve preceding opening command ($r_2$) and an inlet guide vane preceding opening command ($i_2$) based on a deviation between the actual generator output ($W_1$), which is the actual output of the generator, and a first order lag actual generator output ($W_1'$), which has been obtained by first order lag computation of the actual generator output ($W_1$), and the gas compressor control device exercises;

when the load sudden fall signal has not been entered, opening control of the recycle valve based on a value of the recycle valve normal opening command ($r_1$), and opening control of the inlet guide vane based on a value of the inlet guide vane normal opening command ($i_1$); and when the load sudden fall signal has been entered, opening control of the recycle valve based on a value obtained by adding the recycle valve preceding opening command ($r_2$) to the recycle valve normal opening command ($r_1$), and opening control of the inlet guide vane based on a value obtained by adding the inlet guide vane preceding opening command ($i_2$) to the inlet guide vane normal opening command ($i_1$).

Because of the above-described cooperative control by the gas turbine control device and the gas compressor control device, in the event of load loss or load rejection, the recycle valve can be opened in a preceding manner, and the inlet guide vane (IGV) can be closed in a preceding manner. As a result, the fuel gas pressure at the gas compressor outlet can be lowered to suppress the elevation of the fuel gas pressure at the gas turbine inlet. Thus, stable operation can be performed.

BRIEF DESCRIPTION OF THE DRAWINGS

The present invention will become more fully understood from the detailed description given herein below and the accompanying drawings which are given by way of illustration only, and thus are not limitative of the present invention, and wherein.

DESCRIPTION OF THE PREFERRED EMBODIMENTS

Figure 1:
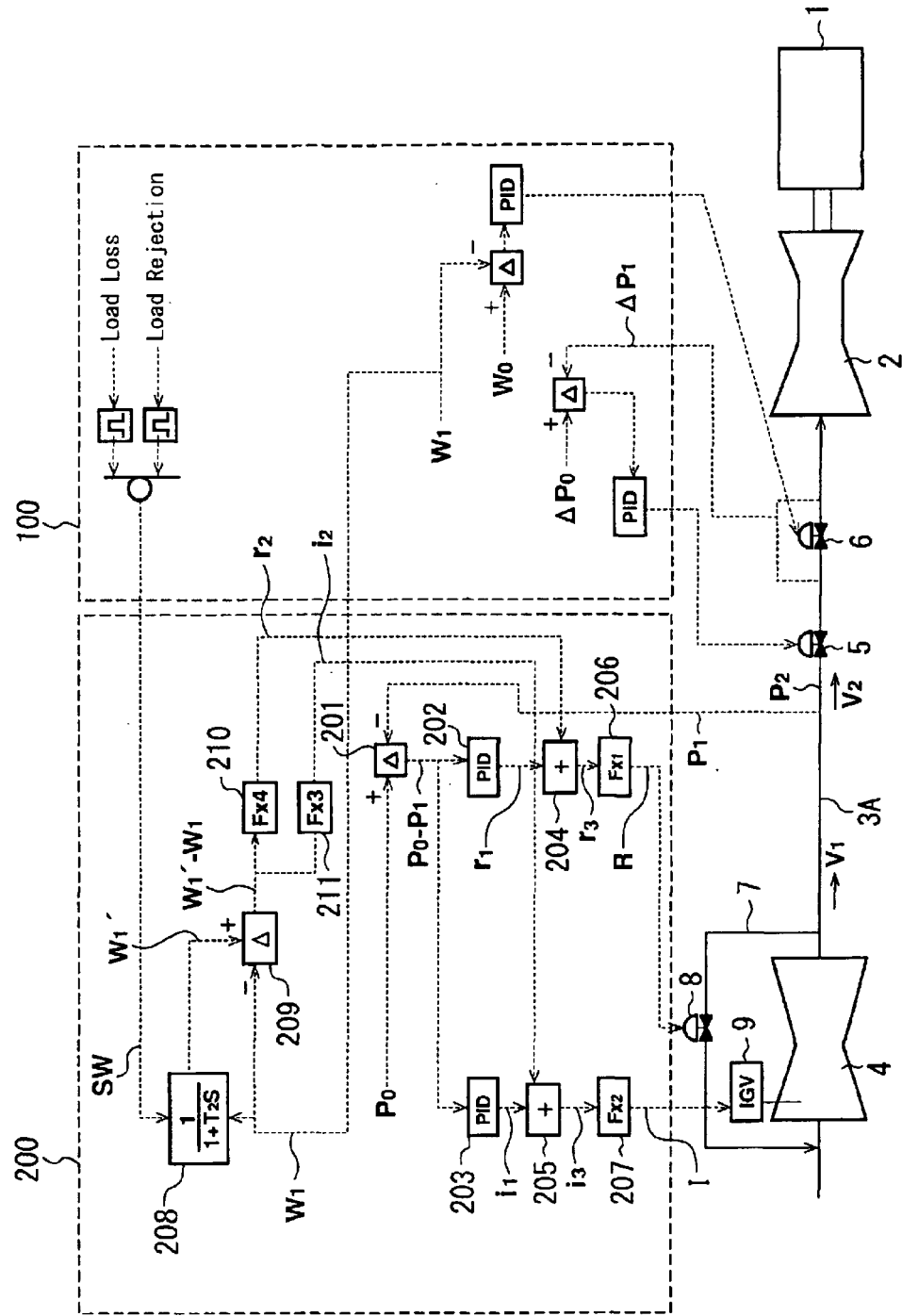
FIG. 1 is a block configurational drawing showing a gas turbine plant incorporating control devices and a control mechanism according to the present invention.

Preferred embodiments and actions of the present invention will now be described with reference to the accompanying drawings, which in no way limit the invention.

In the present invention, signals of actual generator output, parallel-off and sudden load fall (sudden fall in generator output) are fed from a gas turbine control device to a gas compressor control device. If load rejection or load loss occurs in a gas turbine, the gas compressor control device actuates an IGV and a recycle valve of a gas compressor in a preceding manner to prevent a rise in the fuel gas pressure at the inlet of the gas turbine.

The following Bernoulli's equation (1) holds between a fuel gas flow velocity $V_1$ and a fuel gas pressure $P_1$ at the outlet of the gas compressor and a fuel gas flow velocity $V_2$ and a fuel gas pressure $P_2$ at the inlet of the gas turbine. From this Bernoulli's equation (1), equation (2) is derived.

$$\frac{V_1^2}{2g} + \frac{P_1}{\gamma} = \frac{V_2^2}{2g} + \frac{P_2}{\gamma} \tag{1}$$

where $V_1$: fuel gas flow velocity (m/s) at gas compressor outlet,
$V_2$: fuel gas flow velocity (m/s) at gas turbine inlet,
$P_1$: fuel gas pressure (kg/m²) at gas compressor outlet,
$P_2$: fuel gas pressure (kg/m²) at gas turbine inlet, and
γ: gas turbine fuel specific gravity (kg/m³)

$$P_1 = P_2 - (V_1^2 - V_2^2) \times \frac{\gamma}{2g} \quad (2)$$

Furthermore, the following relation (3) statically holds between the flow velocity V of the fuel gas consumed by the gas turbine and a generator output MW.

$$V = f(MW)/A \quad (3)$$

where
MW: gas turbine generator output (actual generator load) (MW), and
A: sectional area of piping That is, if load rejection or load loss occurs, the fuel gas flow velocity (fuel consumption) $V_2$ at the gas turbine inlet lowers. If the fuel gas pressure $P_1$ and the fuel gas flow velocity (discharge) $V_1$ at the gas compressor outlet do not vary at this time, the fuel gas pressure $P_2$ at the gas turbine inlet increases.

After the fuel gas pressure $P_2$ at the gas turbine inlet increases, the fuel gas flow velocity (fuel gas flow rate) $V_1$ at the gas compressor outlet follows the fuel gas flow velocity (fuel consumption) $V_2$ at the gas turbine inlet, so that $V_1 = V_2$, whereupon the fuel gas pressure $P_1$ at the gas compressor outlet also increases.

Finally, the fuel gas pressure is controlled to a prescribed value by fuel gas pressure control at the gas turbine inlet and fuel gas pressure control at the gas compressor outlet. Thus, both of the fuel gas pressures $P_1$ and $P_2$ return to their prescribed values and settle. By then, the fuel gas pressure $P_2$ at the gas turbine inlet fluctuates, causing abnormality to combustion in the gas turbine, generating combustion oscillations.

If the fuel gas piping between the gas turbine and the gas compressor is long, it takes time until $V_1 = V_2$. The fuel gas pressure at the gas compressor outlet minimally fluctuates. Thus, the fuel gas pressure $P_2$ at the gas turbine inlet returns to the prescribed value early, and can minimize influence on gas turbine combustion. Hence, the fuel gas piping has hither to been made long.

However, the aforementioned phenomenon—the elevation of the fuel gas pressure $P_2$ at the gas turbine inlet in the event of load rejection or load loss—can be suppressed, even if the fuel gas piping between the gas turbine and the gas compressor is short, by exercising control such as to lower the fuel gas pressure $P_1$ at the gas compressor outlet in a preceding manner.

Figure 2:
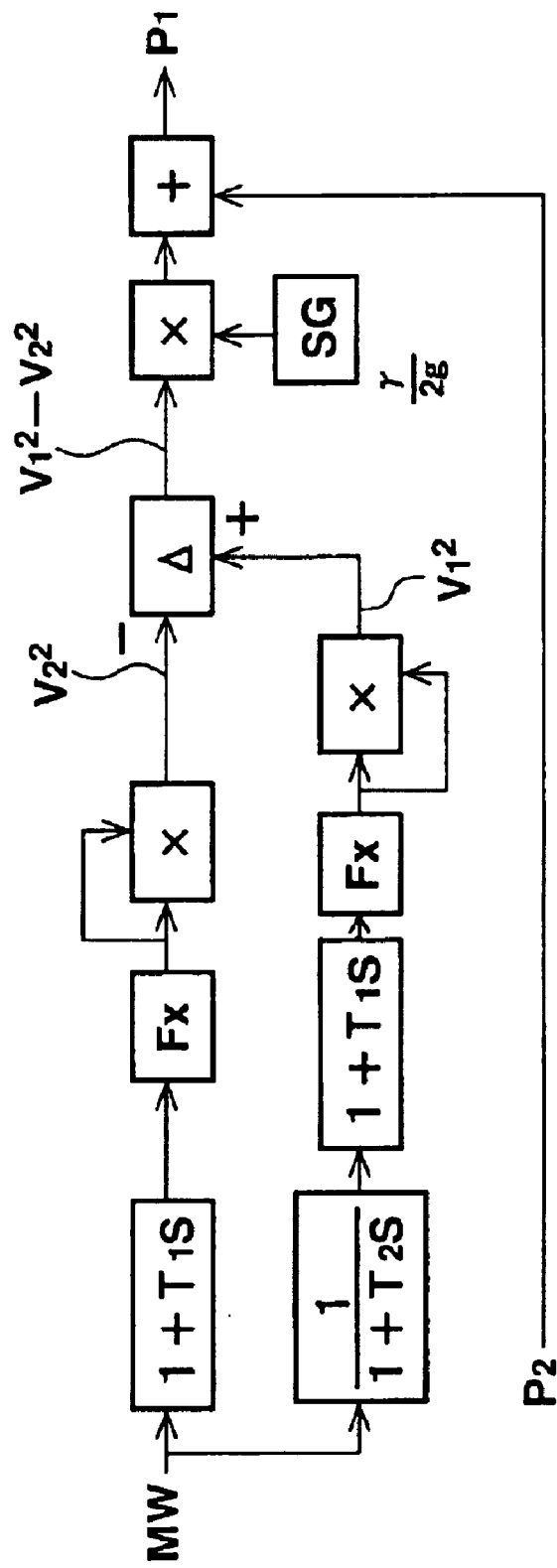
FIG. 2 is a block diagram showing the dynamic characteristics of the gas turbine plant in the event of load rejection or load loss.

The dynamic characteristics in the event of load rejection or load loss are expressed as shown in FIG. 2 by use of a block diagram. In FIG. 2, $T_1$ represents a delay time from the supply of fuel to the gas turbine until the reflection of the fuel supply in the output of the gas turbine, and $T_2$ represents the time from a change in the fuel flow velocity at the gas turbine inlet until the fuel flow velocity change is reflected in the fuel flow velocity at the gas compressor outlet.

In the block diagram of FIG. 2, if the fuel gas piping between the gas turbine and the gas compressor is long, the delay time $T_2$ increases. As a result, the result of calculation of $V_1^2 - V_2^2$ in the event of load rejection or load loss takes a large negative value. Thus, even when the fuel gas pressure $P_2$ at the gas turbine inlet takes a large value, the fuel gas pressure $P_1$ at the gas compressor outlet is not very high.

Finally, $V_1 = V_2$, and the fuel gas pressure $P_1$ at the gas compressor outlet equals the fuel gas pressure $P_2$ at the gas turbine inlet.

Figure 3:
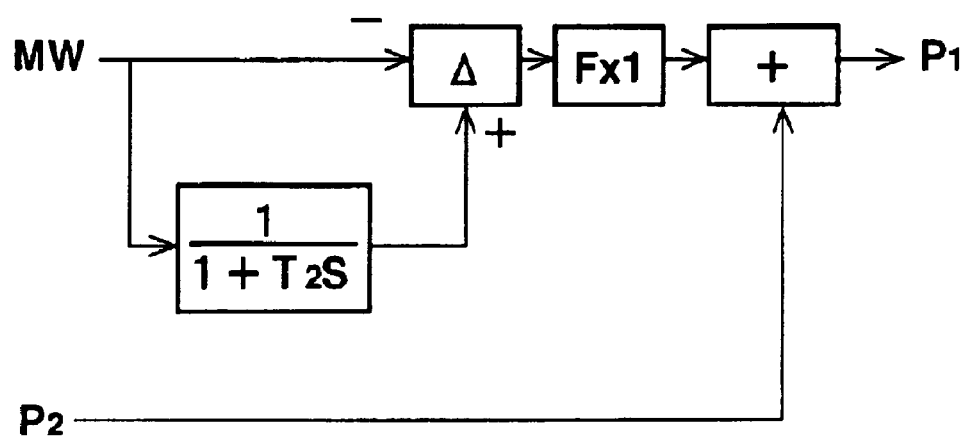
FIG. 3 is a simplified block diagram showing the dynamic characteristics of the gas turbine plant in the event of load rejection or load loss.

The block diagram shown in FIG. 2 can be simplified as shown in the block diagram of FIG. 3.

Before load rejection or load loss occurs, the fuel gas pressure $P_1$ at the gas compressor outlet equals the fuel gas pressure $P_2$ at the gas turbine inlet. Thus, in case of load rejection or load loss, it is found that the elevation of the fuel gas pressure at the gas compressor outlet depends on the value of the actual generator output before the occurrence of load rejection or load loss, or depends on how fast the actual generator output fell.

EXAMPLE

Figure 4:
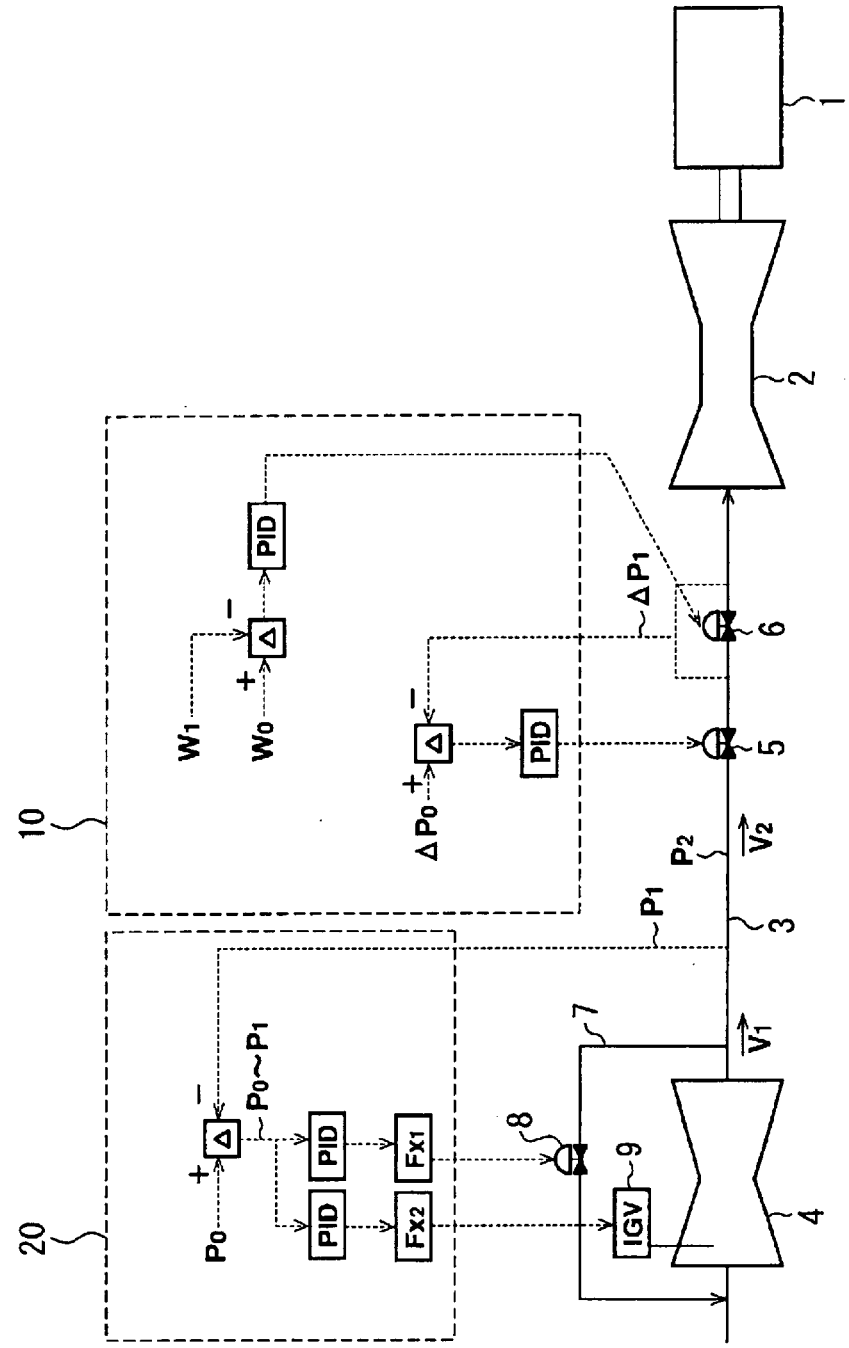
FIG. 4 is a block configurational drawing showing a gas turbine plant incorporating a conventional control device.

Next, an example for embodying the present invention will be described with reference to FIG. 1. Portions exhibiting the same capabilities as in the earlier technology shown in FIG. 4 are assigned the same numerals, and descriptions of these portions will be offered briefly.

As shown in FIG. 1, a gas compressor 4 is provided with a recycle pipe 7, a recycle valve 8, and an IGV (inlet guide vane) 9. A pressure control valve 5 and a flow control valve 6 are interposed in fuel gas piping 3A. A fuel gas, increased in pressure by the gas compressor 4, is passed through the fuel gas piping 3A and supplied to a gas turbine 2. The gas turbine 2 supplied with the fuel gas rotationally drives a generator 1 to generate electric power.

The fuel gas piping 3A is shorter than the conventional fuel gas piping 3. Except that the fuel gas piping 3A is shorter, the above-mentioned mechanical layout and configuration are the same as in the earlier technology (see FIG. 4).

A gas turbine control device 100 controls the valve opening of the flow control valve 6 (i.e. PID control) such that a deviation between an actual generator output $W_1$ and a preset target generator load set value $W_0$ is zero. The gas turbine control device 100 also controls the valve opening of the pressure control valve 5 (i.e. PID control) such that a deviation between a flow control valve differential pressure $\Delta P_1$, which is the difference between the fuel gas pressure upstream from the flow control valve 6 and the fuel gas pressure downstream from the flow control valve 6, and a preset flow control valve differential pressure set value $\Delta P_0$ is zero. These control capabilities are the same as those of the conventional gas turbine control device 10 (see FIG. 4).

In the present embodiment, moreover, the gas turbine control device 100 has the following new capabilities (1) and (2) which the earlier technology lacks:

(1) The capability of sending a load sudden fall signal SW, a one shot pulse, to a gas compressor control device 200 over a preset period, when a sudden fall in load, i.e. at least one of load loss and load rejection, occurs. In this case, the period for which the load sudden fall signal SW is outputted (the period for which the one shot pulse is at a high level) is the period between the occurrence of load loss or load rejection and the settlement of fuel gas pressures $P_1$, $P_2$ at prescribed values. This period is set for each plant.

(2) The capability of sending the actual generator output $W_1$ to the gas compressor control device 200.

The gas compressor control device 200 has the capability of controlling the valve openings of the recycle valve 8 and the IGV 9, and exercises control in manners which are different between normal operation (an operation in the absence of load loss or load rejection) and the occurrence of load loss or load rejection.

First, the respective computing capabilities of the gas compressor control device 200 will be described. Then, the manners of control during normal operation and in the event of a sudden load fall (load loss or load rejection) will be explained.

The deviation computing capability 201 of the gas compressor control device 200 finds a fuel gas pressure deviation $P_1-P_0$, which is a deviation between the fuel gas pressure $P_1$ at the gas compressor outlet and a preset fuel gas supply pressure set value $P_0$.

A PID control capability 202 finds a recycle valve normal opening command $r_1$ based on the fuel gas pressure deviation $P_1-P_0$, while a PID control capability 203 finds an IGV normal opening command $i_1$ based on the fuel gas pressure deviation $P_1-P_0$.

An adding capability 204 adds the recycle valve normal opening command $r_1$ and a recycle valve preceding opening command $r_2$ (to be described later) to find a recycle valve command $r_3$. Whereas an adding capability 205 adds the IGV normal opening command $i_1$ and an IGV preceding opening command $i_2$ (to be described later) to find an IGV command $i_3$.

A recycle valve control function capability ($Fx_1$) 206 finds a recycle valve opening control signal R of a value corresponding to the recycle valve command $r_3$, and opening control of the recycle valve 8 is effected responsive to the value of the recycle valve opening control signal R. Whereas an IGV control function capability ($Fx_2$) 207 finds an IGV opening control signal I of a value corresponding to the IGV command $i_3$, and opening control of the IGV 9 is effected responsive to the value of the IGV opening control signal I.

A first order lag function capability 208 outputs the actual generator output $W_1$, unchanged, during the period of time that the load sudden fall signal SW has not been entered, and outputs a first order lag actual generator output $W_1'$, which has been obtained by first order lag computation of the actual generator output $W_1$, during the period of time that the load sudden fall signal SW has been entered.

A deviation computing capability 209 finds an actual generator output deviation $W_1'-W_1$, which is a deviation between the first order lag actual generator output $W_1'$ and the actual generator output $W_1$.

A recycle valve preceding control function capability ($Fx_4$) 210 finds the recycle valve preceding opening command $r_2$ based on the actual generator output deviation $W_1'-W_1$. An IGV preceding control function capability ($Fx_3$) 211 finds an IGV preceding opening command $i_2$ based on the actual generator output deviation $W_1'-W_1$.

When the load sudden fall signal SW has not been entered, the output of the deviation computing capability 209 is zero, so that the recycle valve preceding opening command $r_2$ and the IGV preceding opening command $i_2$ are also zero. When the load sudden fall signal SW has been entered, the deviation between the first order lag actual generator output $W_1'$ and the actual generator output $W_1$ increases. As a result, the recycle valve preceding opening command $r_2$ and the IGV preceding opening command $i_2$ are outputted which take command values corresponding to the value of the actual generator output deviation $W_1'-W_1$ outputted by the deviation computing capability 209.

With the gas compressor control device 200 having the above capabilities, the recycle valve preceding opening command $r_2$ is zero in normal times. Thus, the recycle valve command $r_3$=the recycle valve normal opening command $r_1$. Consequently, the recycle valve control function capability 206 finds the recycle valve opening control signal R of a value corresponding to the recycle valve command $r_3$ (=$r_1$). Responsive to the value of the recycle valve opening control signal R, opening control of the recycle valve 8 is exercised.

In normal times, the IGV preceding opening command $i_2$ is zero. Thus, the IGV command $i_3$=the IGV normal opening command $i_1$. Consequently, the IGV control function capability 207 finds the IGV opening control signal I of a value corresponding to the IGV command $i_3$ (=$i_1$). Responsive to the value of the IGV opening control signal I, opening control of the IGV 9 is exercised.

As a result, when the fuel gas pressure $P_1$ is high, the valve opening of the recycle valve 8 is great, while the opening of the IGV is small. When the fuel gas pressure $P_1$ is low, the valve opening of the recycle valve 8 is small, while the opening of the IGV is great.

With the gas compressor control device 200 having the above capabilities, the recycle valve preceding opening command $r_2$ takes some value in the event of load loss or load rejection. Thus, the recycle valve command $r_3$=the recycle valve normal opening command $r_1$+the recycle valve preceding opening command $r_2$. Consequently, the recycle valve control function capability 206 finds the recycle valve opening control signal R of a value corresponding to the recycle valve command $r_3$ (=$r_1+r_2$). Responsive to the value of the recycle valve opening control signal R, opening control of the recycle valve 8 is exercised.

In the event of load loss or load rejection, the IGV preceding opening command $i_2$ takes some value. Thus, the IGV command $i_3$=the IGV normal opening command $i_1$+the IGV preceding opening command $i_2$. Consequently, the IGV control function capability 207 finds the IGV opening control signal I of a value corresponding to the IGV command $i_3$ (=$i_1+i_2$). Responsive to the value of the IGV opening control signal I, opening control of the IGV 9 is exercised.

As a result, in the event of load loss or load rejection, the recycle valve 8 can be opened in a preceding manner, while the IGV can be closed in a preceding manner. By so doing, the fuel gas pressure $P_1$ at the gas compressor outlet can be lowered, and the increase in the fuel gas pressure $P_2$ at the gas turbine inlet can be suppressed.

Because of the above-described control, even with the short fuel gas piping 3A, the fuel gas pressures $P_1$, $P_2$ can be prevented from increasing excessively, and breakage of the combustor or the occurrence of combustion oscillations can be prevented, in the event of load loss or load rejection. Thus, stable operation can be ensured.

Actually, when load rejection or load loss occurs, it suffices to suppress a rise in the fuel gas pressure $P_2$ at the gas turbine inlet. Hence, the functions $Fx_3$, $Fx_4$ used by the preceding control function capabilities 210, 211 shown in FIG. 1 are not fed the values obtained strictly by the calculations shown in the block diagrams of FIGS. 2 and 3, but are initially supplied with values sufficiently smaller than the values given by the calculations. Then, the values supplied are adjusted in accordance with changes in the fuel gas pressure $P_2$ at the gas turbine inlet during load fluctuations.

The time constant $T_2$, used in the first order lag function capability 208, is also determined by actually operating the plant, and observing a delay in changes in the fuel gas pressure $P_1$ at the gas compressor outlet in response to changes in the fuel gas pressure $P_2$ at the gas turbine inlet.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A gas compressor control device for exercising opening control of a recycle valve interposed in a recycle pipe which returns a fuel gas from an outlet of a gas compressor to an inlet of said gas compressor, and opening control of an inlet guide vane provided in said gas compressor, said gas compressor control device comprising:

a computing capability unit for computing a recycle valve normal opening command ($r_1$) and an inlet guide vane normal opening command ($i_1$) based on a deviation between a fuel gas pressure ($P_1$) at said gas compressor outlet and a preset fuel gas supply pressure set value ($P_0$); and a computing capability unit for computing a recycle valve preceding opening command ($r_2$) and an inlet guide vane preceding opening command ($i_2$) based on a deviation between an actual generator output ($W_1$), which is an actual output of a generator rotationally driven by a gas turbine supplied with the fuel gas from said gas compressor, and a first order lag actual generator output ($W_1'$), which has been obtained by first order lag computation of said actual generator output ($W_1$), and said gas compressor control device exercising:

during a normal operation, opening control of said recycle valve based on a value of said recycle valve normal opening command ($r_1$), and opening control of said inlet guide vane based on a value of said inlet guide vane normal opening command ($i_1$); and in an event of a sudden load fall, opening control of said recycle valve based on a value obtained by adding said recycle valve preceding opening command ($r_2$) to said recycle valve normal opening command ($r_1$), and opening control of said inlet guide vane based on a value obtained by adding said inlet guide vane preceding opening command ($i_2$) to said inlet guide vane normal opening command ($i_1$).

2. A gas turbine plant control mechanism comprising:

a gas compressor control device for exercising opening control of a recycle valve interposed in a recycle pipe which returns a fuel gas from an outlet of a gas compressor to an inlet of said gas compressor, and opening control of an inlet guide vane provided in said gas compressor; and a gas turbine control device for exercising opening control of a pressure control valve and a flow control valve interposed in gas piping which feeds the fuel gas from said gas compressor to a gas turbine, and wherein:

said gas turbine control device comprises a capability unit for feeding an actual generator output ($W_1$), which is an actual output of a generator rotationally driven by said gas turbine, to said gas compressor control device, and for feeding a load sudden fall signal to said gas compressor control device for a preset period of time when load loss or load rejection occurs; and said gas compressor control device comprises:

a computing capability unit for computing a recycle valve normal opening command ($r_1$) and an inlet guide vane normal opening command ($i_1$) based on a deviation between a fuel gas pressure ($P_1$) at said gas compressor outlet and a preset fuel gas supply pressure set value ($P_0$); and a computing capability unit for computing a recycle valve preceding opening command ($r_2$) and an inlet guide vane preceding opening command ($i_2$) based on a deviation between said actual generator output ($W_1$), which is the actual output of said generator, and a first order lag actual generator output ($W_1'$), which has been obtained by first order lag computation of said actual generator output ($W_1$), and said gas compressor control device exercises:

when said load sudden fall signal has not been entered, opening control of said recycle valve based on a value of said recycle valve normal opening command ($r_1$), and opening control of said inlet guide vane based on a value of said inlet guide vane normal opening command ($i_1$); and when said load sudden fall signal has been entered, opening control of said recycle valve based on a value obtained by adding said recycle valve preceding opening command ($r_2$) to said recycle valve normal opening command ($r_1$), and opening control of said inlet guide vane based on a value obtained by adding said inlet guide vane preceding opening command ($i_2$) to said inlet guide vane normal opening command ($i_1$).

* * * * *